(12) United States Patent
Starzynski

(10) Patent No.: US 8,176,617 B2
(45) Date of Patent: May 15, 2012

(54) METHODS FOR MAKING A SENSITIVE RESONATING BEAM ACCELEROMETER

(75) Inventor: John S. Starzynski, North Bend, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/751,157

(22) Filed: Mar. 31, 2010

(65) Prior Publication Data

US 2011/0239440 A1    Oct. 6, 2011

(51) Int. Cl.
*H04R 31/00* (2006.01)
(52) U.S. Cl. .......... 29/594; 29/595; 29/609.1; 29/25.35; 310/313 A; 310/313 B; 310/313 R; 333/150; 333/187; 333/193; 333/195; 333/196
(58) Field of Classification Search ............ 29/52.1, 29/594, 595, 609.1; 310/313 A, 313 B, 313 R; 333/150, 187, 193, 195, 196
See application file for complete search history.

(56) References Cited

U.S. PATENT DOCUMENTS

| | | | |
|---|---|---|---|
| 4,939,935 A | 7/1990 | Amand | |
| 5,644,081 A | 7/1997 | Schwarz et al. | |
| 5,644,083 A | 7/1997 | Newell et al. | |
| 5,656,778 A * | 8/1997 | Roszhart | 73/504.04 |
| 5,668,057 A | 9/1997 | Eda et al. | |
| 6,595,054 B2 * | 7/2003 | Paros et al. | 73/504.04 |
| 7,655,538 B2 | 2/2010 | Sawyer | |
| 2009/0241665 A1 * | 10/2009 | Novack | 73/514.29 |

OTHER PUBLICATIONS

Martin A. Schmidt; Wafer-to-wafer bonding for microstructure formation; Proceedings of the IEEE, vol. 86, No. 8, Aug. 1998.

* cited by examiner

*Primary Examiner* — Paul D Kim
(74) *Attorney, Agent, or Firm* — Lowe Graham Jones PLLC

(57) ABSTRACT

A method of making a resonating beam accelerometer (RBA). In an example process, a proof mass device and resonators are created from a quartz material. A direct bond is formed between the proof mass and the resonators by applying a predefined amount of pressure at a predefined temperature for a predefined amount of time. One or more damping plates are created from a quartz material. A direct bond is formed between the damping plates and the proof mass device. The proof mass device is created by applying a predefined amount of pressure at pressure at temperature to two bases, two proof mass portions, and a flexure. The proof mass bases are on opposite sides of the flexure. The proof mass portions are on opposite sides of the flexure. A gap is present between the proof mass bases and the proof mass portions.

4 Claims, 2 Drawing Sheets

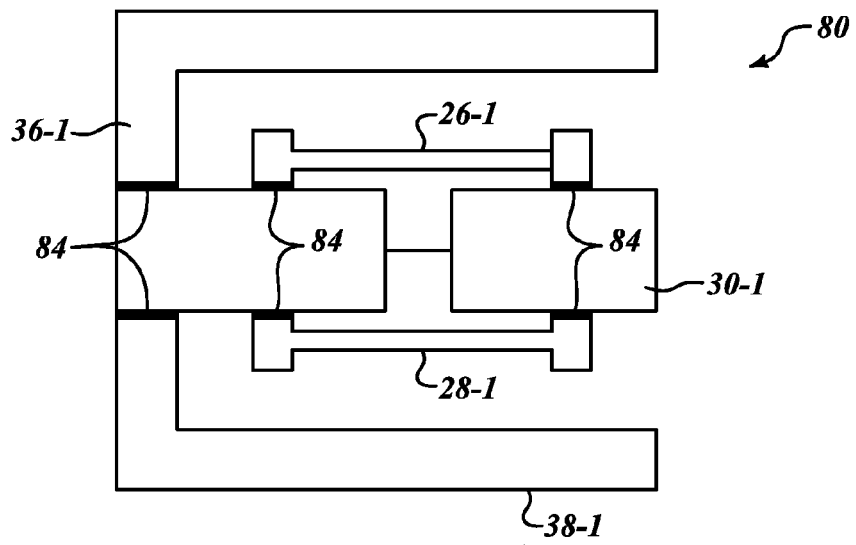
FIG. 6
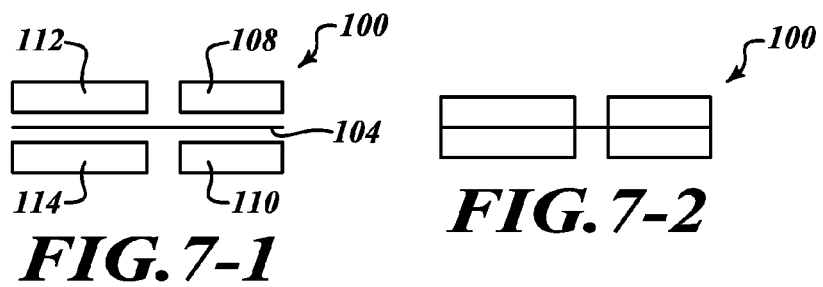
FIG. 7-1     FIG. 7-2
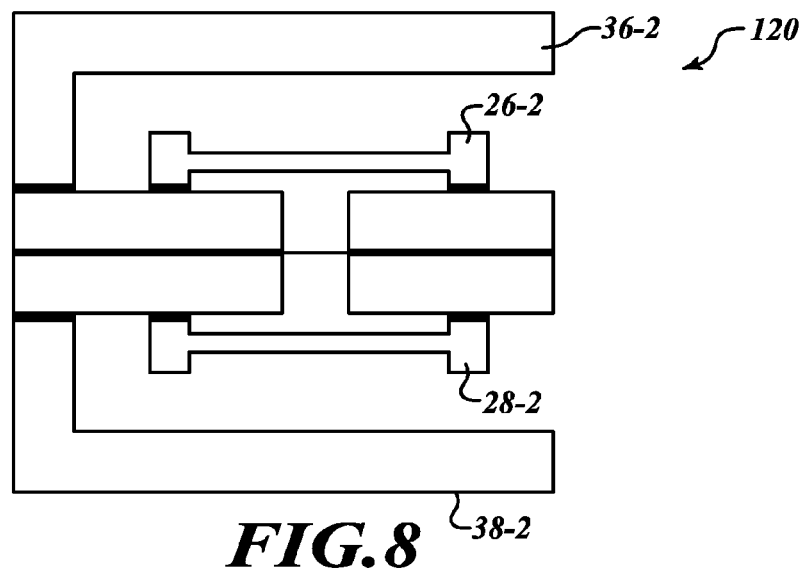
FIG. 8

METHODS FOR MAKING A SENSITIVE RESONATING BEAM ACCELEROMETER

GOVERNMENT INTEREST

The invention described herein was made in the performance of work under U.S. Government Contract No. FA9453-05-C-0241 awarded by Air Force Research Laboratories. The Government may have rights to portions of this invention.

BACKGROUND OF THE INVENTION

The sensitivity of an accelerometer can be degraded by creep of bonded joints. It can also be degraded by a difference in the coefficient of thermal expansion (CTE) between the bonding solder or glue and the bonded pieces.

The resonators and damping plates are typically attached employing either solder or glue. Glue, and to a lesser degree solder, may creep (the tendency of a solid material to slowly move or deform under the influence of stress), thus degrading the sensitivity of the accelerometer.

In addition, the sensitivity of an accelerometer can be degraded by machining imperfections in the proof mass hinge. Machining the hinge can introduce microcracking in the hinge, resulting in loss of accelerometer sensitivity and/or hinge failure.

One way to manufacture a hinge is to glue or solder a thin blank between four proof mass sections. Once again, creep of the solder or glue, as well as the CTE mismatched between the solder or the glue and the proof mass material, will degrade sensitivity.

SUMMARY OF THE INVENTION

The present invention provides a method of making a resonating beam accelerometer (RBA). In an example process, a proof mass device and resonators are created from a quartz material. A direct bond is formed between the proof mass and the resonators by applying a predefined amount of pressure at a predefined temperature for a predefined amount of time.

In one aspect of the invention, one or more damping plates are created from a quartz material. A direct bond is formed between the damping plates and the proof mass device by applying a predefined amount of pressure at a predefined temperature for a predefined amount of time.

In another aspect of the invention, the proof mass device is created by applying a predefined amount of pressure at a predefined temperature for a predefined amount of time to two proof mass bases, two moveable proof mass portions, and a flexure layer, thereby forming a direct bond between the parts. The proof mass bases are located on opposing sides of the flexure layer at one end of the flexure layer. The moveable proof mass portions are located on opposing sides of the flexure layer at another end of the flexure layer. A gap is present between the proof mass bases and the moveable proof mass portions.

BRIEF DESCRIPTION OF THE DRAWINGS

Preferred and alternative embodiments of the present invention are described in detail below with reference to the following drawings:

FIGS. 2-1, 2-2 are top and side views of a proof mass used in the RBA of FIG. 1;

FIGS. 3-1, 3-2 are side and top views of a resonator that is used in the RBA shown in FIG. 1;

FIGS. 4-1, 4-2, 4-3 are side, bottom, and top views of a top damping device used in the RBA shown in FIG. 1;

FIG. 6 illustrates direct bonds of an exemplary RBA;

FIGS. 7-1, 7-2 are side views showing construction of a proof mass according to an alternate embodiment of the present invention; and FIG. 8 is a side view of an RBA incorporating the proof mass of FIG. 7-2.

DETAILED DESCRIPTION OF THE INVENTION

The present invention provides a sensitive resonating beam accelerometer (RBA) and a method for making a sensitive RBA. RBAs measure acceleration as a function of the frequency difference between two sets of vibrating quartz beams.

Figure 1:
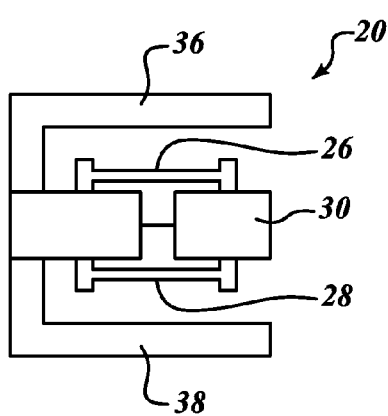
FIG. 1 is a side cross-sectional view of a resonating beam accelerometer (RBA) formed in accordance with an embodiment of the present invention.

As shown in FIG. 1, an exemplary RBA 20 includes two sets of resonators 26, 28, a hinged proof mass 30, and two damping plates 36, 38. The damping plates 36, 38 damp out the oscillation of the proof mass 30. All the components are manufactured from the same type of material typically fused silica (amorphous quartz) or single crystal quartz.

Figures 1, 2:
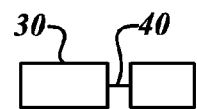
Figure 2:
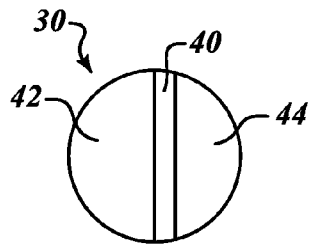
Figures 1, 3:
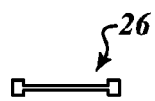
Figures 2, 3:
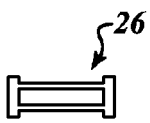
Figures 1, 4:
Figures 2, 4:
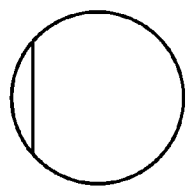
Figures 3, 4:
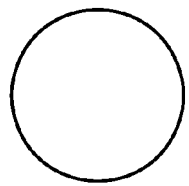
Figure 5:
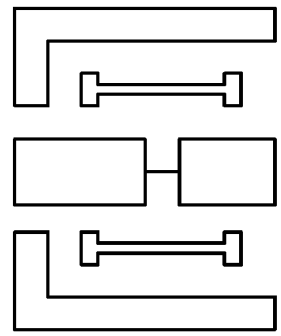
FIG. 5 is an exploded view of the RBA of FIG. 1.

FIGS. 2-1, 2-2 are top and side views of the proof mass 30. FIGS. 3-1, 3-2 are top and side views of the top set of resonators 26. FIGS. 4-1, 4-2, 4-3 are top, bottom, and side views of the top damping plate 36. FIG. 5 is an exploded view of the RBA 20.

The proof mass 30 includes a thinned region 40 that spans across two thicker portions 42, 44. The thinned region 40 acts as a bending point (flexure) for the end portions 42, 44 of the proof mass 30. The resonators 26, 28 are attached, perpendicular to the hinge, between each of the portions 42, 44 of the proof mass 30. The damping plates 36, 38 are attached to both the top and bottom sides of the stationary portion 42 of the proof mass 30. When the RBA 20 experiences an acceleration force, the movable portion 44 of the proof mass 30 will bend and one set of the resonators 26, 28 will increase in frequency and the other set will decrease in frequency. The magnitude of the acceleration is determined by these frequency changes.

Prior to assembly of the RBA components, the joining surfaces are polished. The parts are polished using standard mechanical glass polishing techniques. Then the surfaces are cleaned in a solution containing water, hydrogen peroxide, and ammonium hydroxide and then dried. The components are placed and held together at a predefined pressure of between 0.2 and 40 atmospheres with tooling (not shown) and heated to a temperature above 200° C. for several hours. Atoms from the components will interdiffuse and form a direct bond. This bond will not creep and if the joined parts are of the same material, there will be no CTE mismatch between the bond and the joined pieces.

As shown in FIG. 6, an RBA 80 has been assembled using direct bonding. Damping plates 36-1, 38-1 and resonators 26-1, 28-1 are direct bonded to a proof mass 30-1 according to the process described above. Direct bonds 84 now exist between the parts.

FIGS. 7-1 and 7-2 show exploded and assembled views of a proof mass 100 fabricated with direct bonding. The proof mass 100 includes five pieces: a hinge layer 104, between 0.001 to 0.010 inches thick; two proof mass ends 108, 110 between 0.050 to 0.250 inches thick; and two proof mass bases 112, 114 between 0.050 to 0.250 inches thick. The proof mass 100 is created by applying the direct bonding technique described above. The result is a direct bond created between the ends 108, 110, and bases 112, 114, and the hinge 104.

As shown in FIG. 8, an RBA 120 is assembled by employing direct bonding using the proof mass 100 shown in FIG. 7-2. Damping plates 36-2, 38-2 and resonators 26-2, 28-2 are direct bonded to the proof mass 100. The highlighted lines 124 indicate where direct bonds occur.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of making a resonating beam accelerometer (RBA), the method comprising:
   creating a proof mass from a first quartz material;
   creating at least two resonators from a second quartz material; and
   applying a predefined amount of pressure at a predefined temperature for a predefined amount of time to the at least two resonators and the proof mass, thereby forming a direct bond between the proof mass and each of the resonators;
   creating at least one damping plate from a third quartz material; and
   applying a predefined amount of pressure at a predefined temperature for a predefined amount of time to the at least one damping plate and the proof mass, thereby forming a direct bond between the proof mass and the at least one damping plate,
   wherein the third quartz material has a CTE that is within a threshold amount of the first quartz material,
   wherein the first quartz material has a coefficient of thermal expansion (CTE) that is within a threshold amount of a CTE of the second quartz material.

2. The method of claim 1, wherein the CTEs of the first and second quartz materials are identical.

3. The method of claim 1, wherein the CTEs of the first and third quartz materials are identical.

4. A method of making a resonating beam accelerometer (RBA), the method comprising:
   creating a proof mass from a first quartz material;
   creating at least two resonators from a second quartz material; and
   applying a predefined amount of pressure at a predefined temperature for a predefined amount of time to the at least two resonators and the proof mass, thereby forming a direct bond between the proof mass and each of the resonators,
   wherein the first quartz material has a coefficient of thermal expansion (CTE) that is within a threshold amount of a CTE of the second quartz material,
   wherein creating the proof mass comprises:
      creating two proof mass bases;
      creating two moveable proof mass portions;
      creating a flexure layer; and
      applying a predefined amount of pressure at a predefined temperature for a predefined amount of time to the proof mass bases, the moveable proof mass portions, and the flexure layer, thereby forming a direct bond between the flexure layer and the proof mass bases and the moveable proof mass portions,
   wherein the proof mass bases are located on opposing sides of the flexure layer at one end of the flexure layer, the moveable proof mass portions are located on opposing sides of the flexure layer at another end of the flexure layer, wherein a gap is present between the proof mass bases and the moveable proof mass portions.

* * * * *

UNITED STATES PATENT AND TRADEMARK OFFICE
CERTIFICATE OF CORRECTION

| | | |
|---|---|---|
| PATENT NO. | : 8,176,617 B2 | Page 1 of 1 |
| APPLICATION NO. | : 12/751157 | |
| DATED | : May 15, 2012 | |
| INVENTOR(S) | : John S. Starzynski | |

It is certified that error appears in the above-identified patent and that said Letters Patent is hereby corrected as shown below:

Specification,

Col 1, line 9: "The Government may have rights" should be changed to -- The Government has certain rights --.

Signed and Sealed this
Fifth Day of April, 2016

Michelle K. Lee
*Director of the United States Patent and Trademark Office*